US008514294B2

(12) United States Patent
Muramatsu

(10) Patent No.: US 8,514,294 B2
(45) Date of Patent: Aug. 20, 2013

(54) IMAGE TRACKING APPARATUS AND IMAGE TRACKING METHOD

(75) Inventor: Keiko Muramatsu, Tachikawa (JP)

(73) Assignee: Nikon Corporation, Tokyo (JP)

( * ) Notice: Subject to any disclaimer, the term of this patent is extended or adjusted under 35 U.S.C. 154(b) by 133 days.

(21) Appl. No.: 12/868,162

(22) Filed: Aug. 25, 2010

(65) Prior Publication Data

US 2011/0090355 A1    Apr. 21, 2011

(30) Foreign Application Priority Data

Aug. 25, 2009 (JP) .................................. 2009-194288

(51) Int. Cl.
 *H04N 5/228* (2006.01)
(52) U.S. Cl.
 USPC ................................... 348/222.1; 348/208.14
(58) Field of Classification Search
 USPC ...................... 348/169, 208.14, 345; 382/103
 See application file for complete search history.

(56) References Cited

U.S. PATENT DOCUMENTS

| 2007/0268969 | A1* | 11/2007 | Kim et al. ................. 375/240.24 |
| 2009/0296987 | A1* | 12/2009 | Kageyama et al. ........... 382/103 |
| 2010/0166261 | A1* | 7/2010 | Tsuji ............................. 382/103 |
| 2010/0208127 | A1* | 8/2010 | Takada et al. ................. 348/349 |
| 2010/0232646 | A1* | 9/2010 | Takeuchi ....................... 382/103 |

FOREIGN PATENT DOCUMENTS

| JP | A-9-130784 | 5/1997 |
| JP | A-2001-243478 | 9/2001 |
| JP | A-2003-319388 | 11/2003 |
| JP | A-2004-206320 | 7/2004 |
| JP | A-2008-40710 | 2/2008 |
| JP | A-2008-113423 | 5/2008 |
| JP | A-2009-48428 | 3/2009 |
| JP | A-2009-177503 | 8/2009 |

OTHER PUBLICATIONS

Oct. 30, 2012 Office Action issued in Japanese Patent Application No. 2009-194288 (with translation).
Office Action issued in Japanese Patent Application No. 2009-194288 dated Mar. 26, 2013 (with translation).

\* cited by examiner

*Primary Examiner* — Gevell Selby
(74) *Attorney, Agent, or Firm* — Oliff & Berridge, PLC

(57) ABSTRACT

An image tracking apparatus includes: an imaging unit that repeatedly captures an image formed through an imaging optical system to generate a photographing image; a calculation unit that sets a first search region and a second search region other than the first search region in the photographing image, calculates a first calculation result indicating correlation between image information on the first search region and reference information based on a target image, and calculates a second calculation result indicating correlation between image information on the second search region and the reference information; and a detection unit that detects a position of the target image in the photographing image based on either one of the first calculation result and the second calculation result.

12 Claims, 13 Drawing Sheets

SUBJECT MOVING VECTOR

SUBJECT MOVING VECTOR

IMAGE TRACKING APPARATUS AND IMAGE TRACKING METHOD

INCORPORATION BY REFERENCE

The disclosure of the following priority application(s) is herein incorporated by reference:

Japanese Patent Application No. 2009-194288 filed Aug. 25, 2009.

BACKGROUND OF THE INVENTION

1. Field of the Invention

The present invention relates to an image tracking apparatus and an image tracking method.

2. Description of Related Art

Japanese Patent Application Laid-Open Patent Publication No. 2001-243478 discloses an image tracking device for tracking a target subject image that moves in a photographic screen. In the image tracking device, when a moving subject is photographed, an image of the subject in an indicated area of the photographic screen is obtained as a template image. The image tracking device tracks the subject image to be tracked moving in the photographic screen by searching for a position of the image same as or similar to the template image of repeatedly photographed images (template matching).

SUMMARY OF THE INVENTION

However, it is difficult to set the size and position of a range of search for the subject to be tracked precisely according to results of correlation calculation and a motion vector of the moving subject to be tracked and there arises a problem that it is possible that a subject other than a moving subject in the scene is erroneously detected as a target moving subject to be tracked.

According to the 1st aspect of the present invention, an image tracking apparatus comprises: an imaging unit that repeatedly captures an image formed through an imaging optical system to generate a photographing image; a calculation unit that sets a first search region and a second search region other than the first search region in the photographing image, calculates a first calculation result indicating correlation between image information on the first search region and reference information based on a target image, and calculates a second calculation result indicating correlation between image information on the second search region and the reference information; and a detection unit that detects a position of the target image in the photographing image based on either one of the first calculation result and the second calculation result.

According to the 2nd aspect of the present invention, it is preferred that the calculation unit of the image tracking apparatus according to the 1st aspect sets the first search region and the second search region such that a size of the first search region is different from a size of the second search region.

According to the 3rd aspect of the present invention, the calculation unit of the image tracking apparatus according to the 1st aspect may set the first search region and the second search region such that the first search region and the second search region at least partly overlap each other.

According to the 4th aspect of the present invention, the image tracking apparatus according to the 1st aspect may further comprise a region setting unit that sets any one of a predetermined region centered on a position of the target image detected last time by the detection unit and a predetermined region fixed in the photographing image as one of the first search region and the second search region.

According to the 5th aspect of the present invention, it is preferred that the image tracking apparatus according to the 1st aspect further comprises: an estimation unit that estimates a position of the target image in the photographing image to be acquired next time by the imaging unit based on positions of the target image detected a plurality of times by the detection unit; and a region setting unit that sets any two of a first predetermined region, a second predetermined region and a third predetermined region as the first search region and the second search region, the first predetermined region being centered on a position of the target image detected last time by the detection unit, the second predetermined region being fixed in the photographing image, and the third predetermined region being centered on a position of the target image estimated by the estimation unit.

According to the 6th aspect of the present invention, it is preferred that the second predetermined region of the image tracking apparatus according to the 5th aspect is constituted by any one of an entire region in the photographing image, a region near a center of the photographing image and a region that includes a focus detection position set corresponding to the photographing image.

According to the 7th aspect of the present invention, it is preferred that in the image tracking apparatus according to the 1st aspect, the calculation unit sets the first search region as a region larger than the second search region, and the image tracking apparatus further comprising a first determination unit that determines whether or not a difference between the first calculation result and the second calculation result exceeds a first threshold value, and the detection unit detects of the position of the target image based on the first calculation result when the difference exceeds the first threshold value or based on the second calculation result when the difference is less than the first threshold value.

According to the 8th aspect of the present invention, it is preferred that the image tracking apparatus according to the 7th aspect further comprises: a second determination unit that determines whether or not a value associated with a movement distance of the target image in the photographing image is less than a second threshold value based on positions of the target image detected a plurality of times by the detection unit, wherein the detection unit detects the position of the target image based on the second calculation result when the difference is determined to be less than the first threshold value and the value associated with the movement distance is determined to be less than the second threshold value, or detects the position of the target image based on the first calculation result when the difference is determined to be less than the first threshold value and the value associated with the movement distance is determined to be equal to or larger than the second threshold value.

According to the 9th aspect of the present invention, it is preferred that the image tracking apparatus according to the 1st aspect further comprises: a priority setting unit that sets priority on the first calculation result and the second calculation result, wherein the detection unit detects the position of the target image based on a calculation result having higher priority when the difference between the first calculation result and the second calculation result is less than the first threshold value.

According to the 10th aspect of the present invention, the image tracking apparatus according to the 7th aspect may further comprise: a threshold value setting unit that sets the first threshold value as a predetermined fixed value.

According to the 11th aspect of the present invention, the image tracking apparatus according to the 7th aspect may further comprise: a threshold value setting unit that sets the first threshold value based on the first calculation result and the second calculation result.

According to the 12th aspect of the present invention, a method of tracking an image comprises: repeatedly capturing an image formed through an imaging optical system to generate a photographing image; setting a first search region and a second search region other than the first search region in the photographing image, calculating a first calculation result indicating correlation between image information on the first search region and reference information based on a target image and calculating a second calculation result indicating correlation between image information on the second search region and the reference information; and detecting a position of the target image in the photographing image based on either one of the first calculation result and the second calculation result.

BRIEF DESCRIPTION OF TIM DRAWINGS

Figures 6A, 6B:
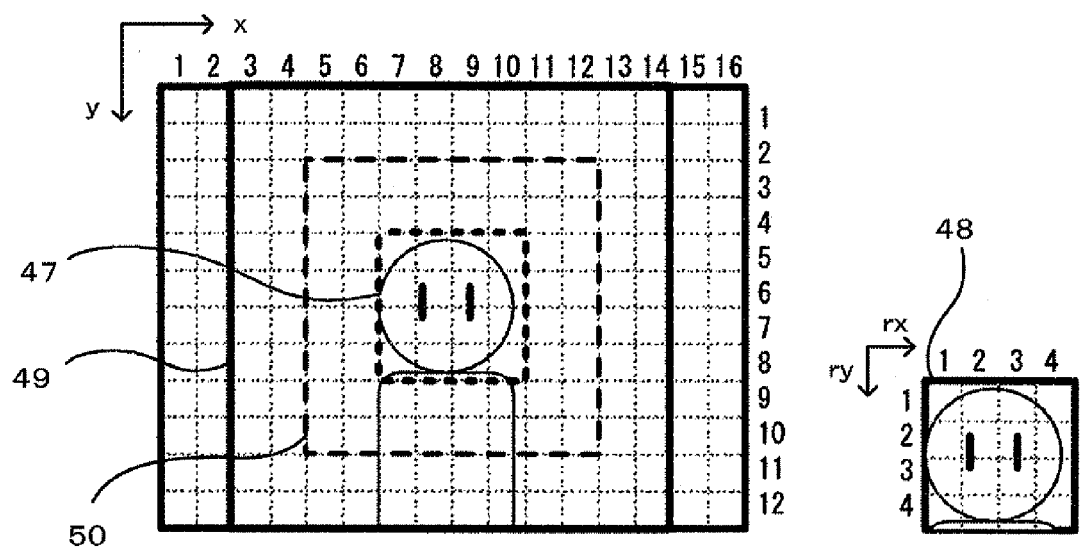
Figure 7B:
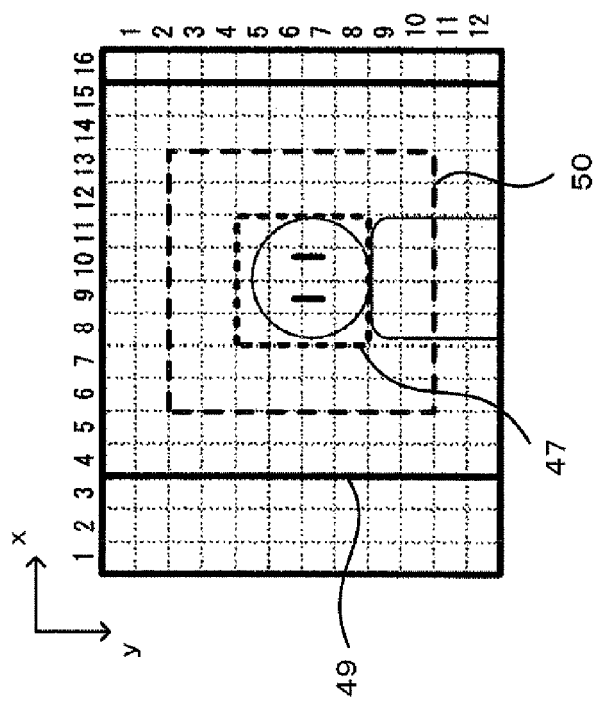
Figure 7A:
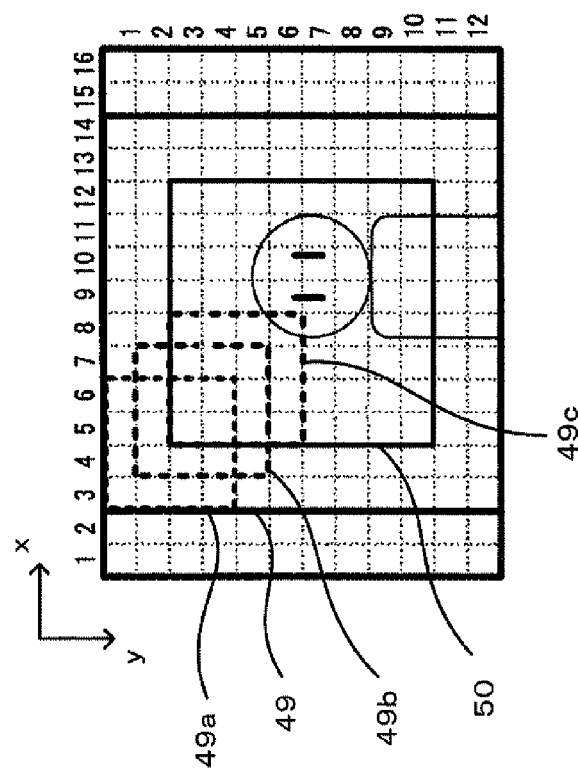
Figure 8:
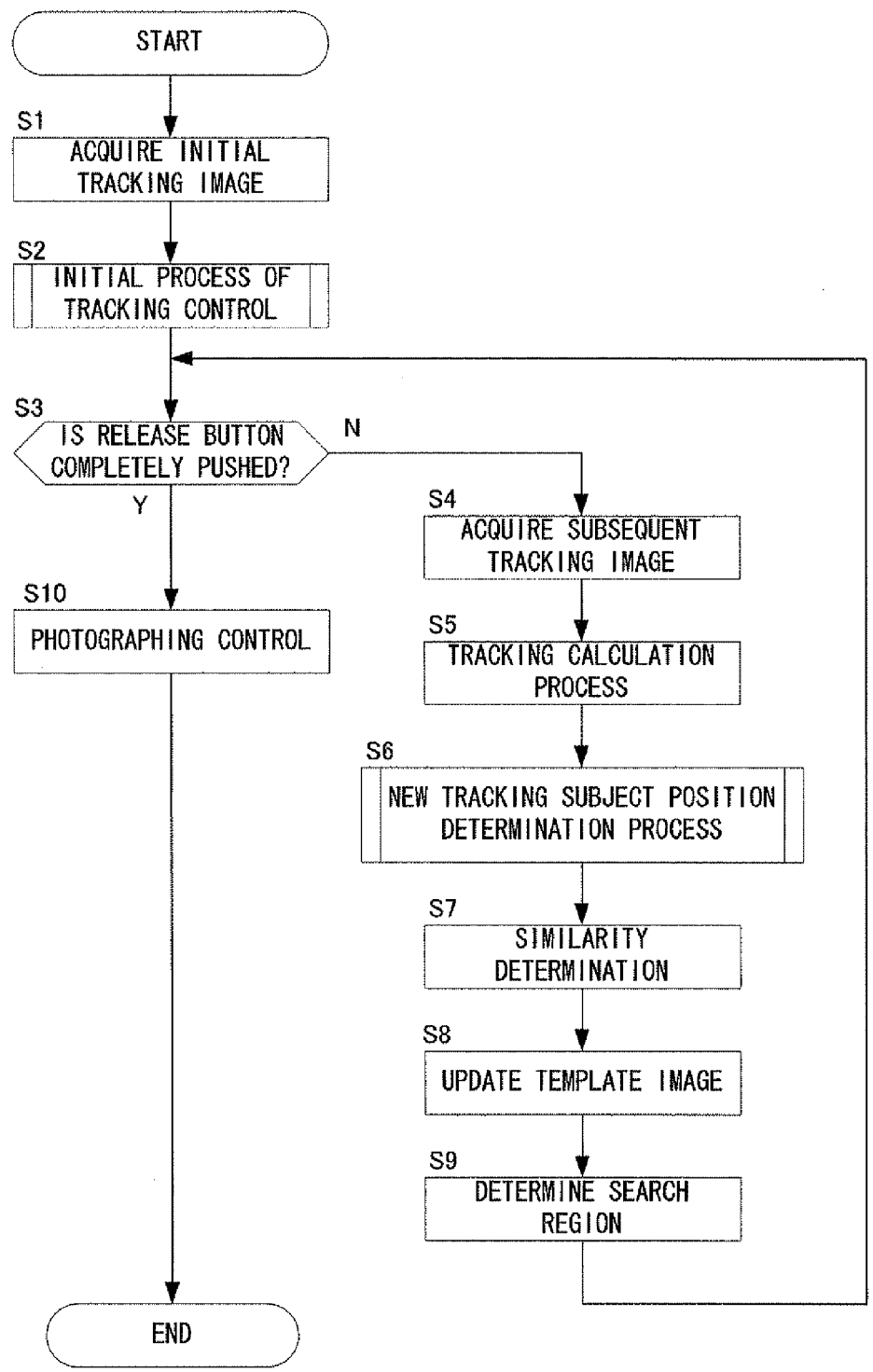
Figure 9:
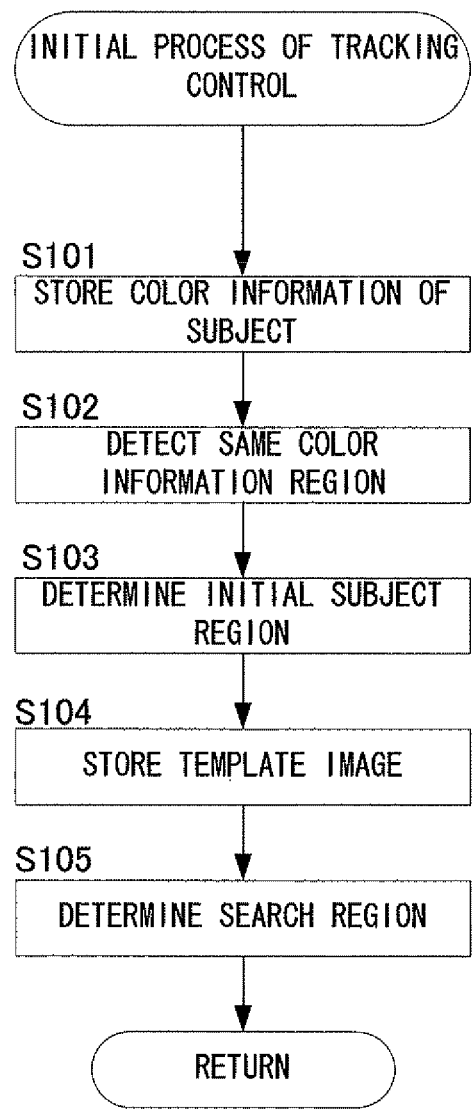
Figure 10:
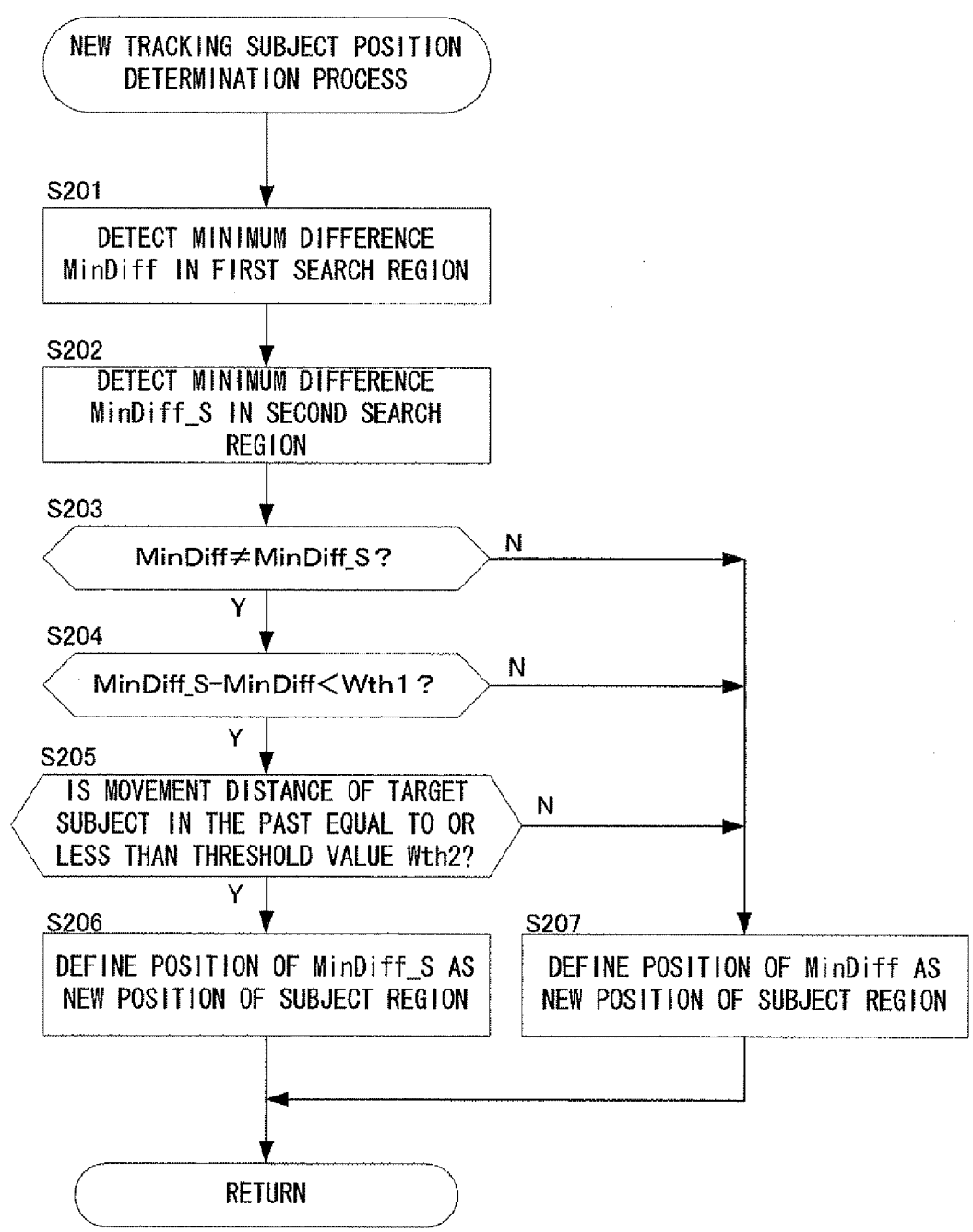
Figure 11A:
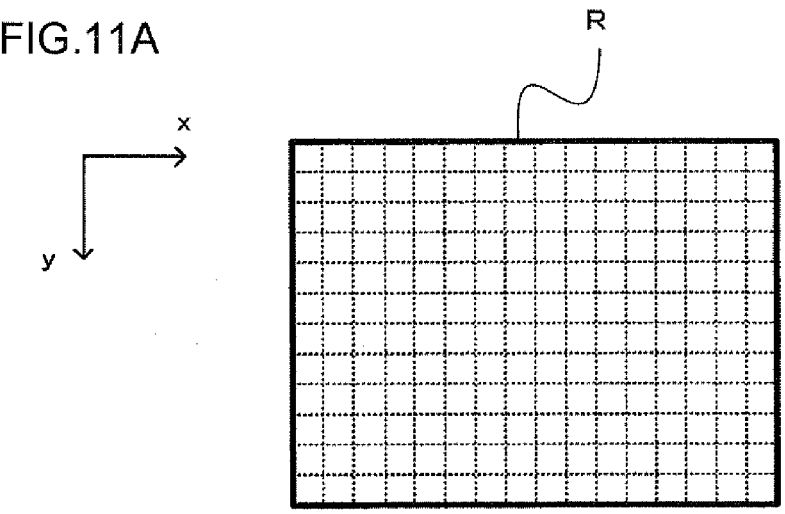
Figure 11B:
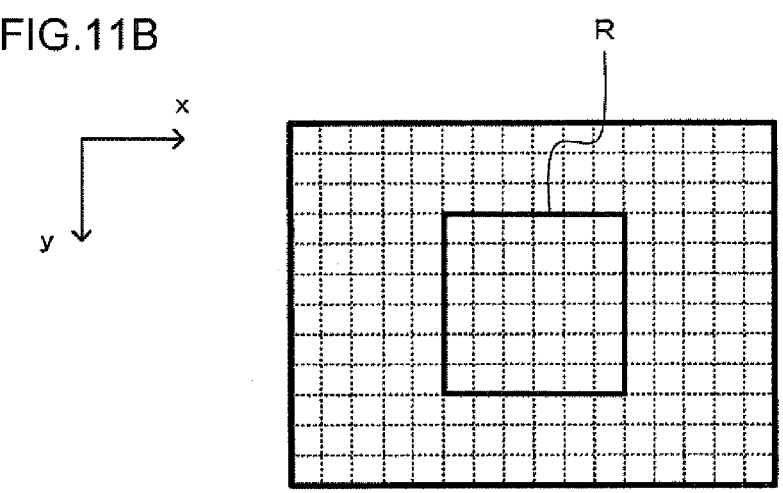
Figure 11C:
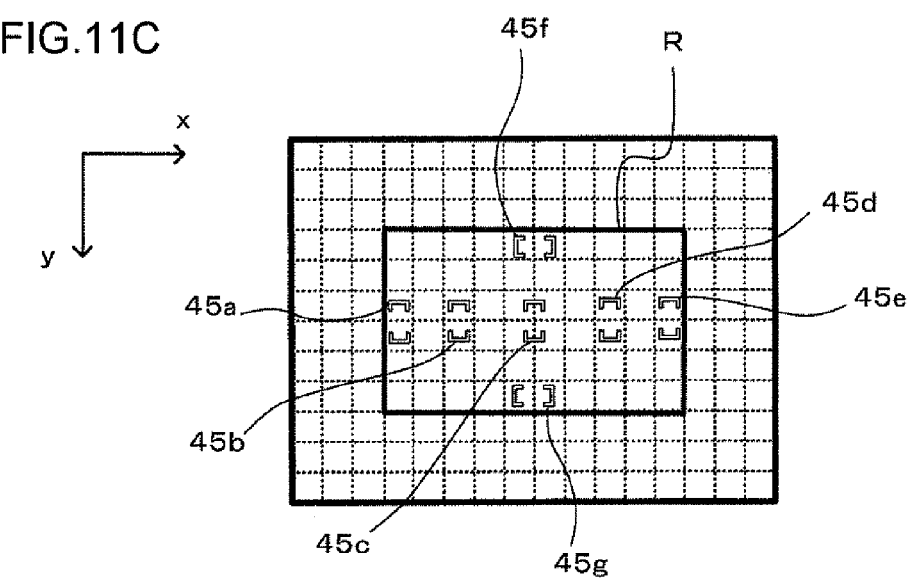
Figure 12A:
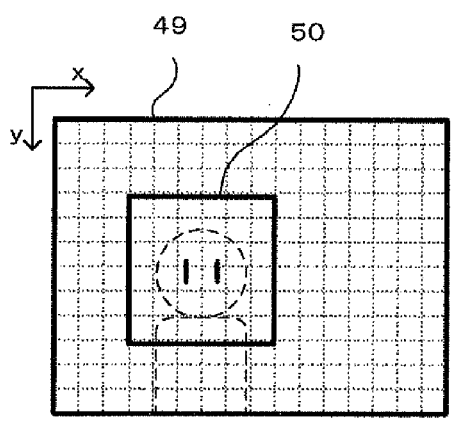
Figure 12B:
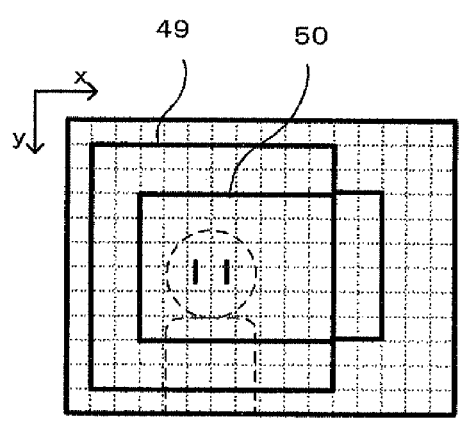
Figure 12C:
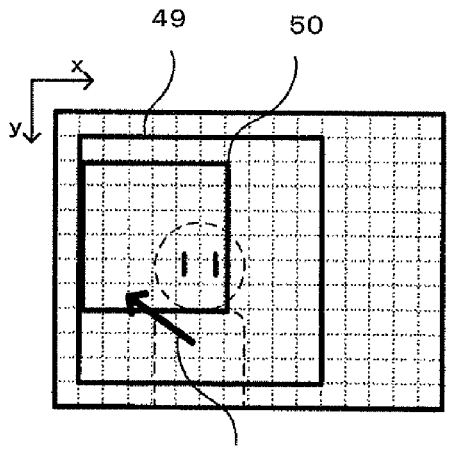
Figure 12D:
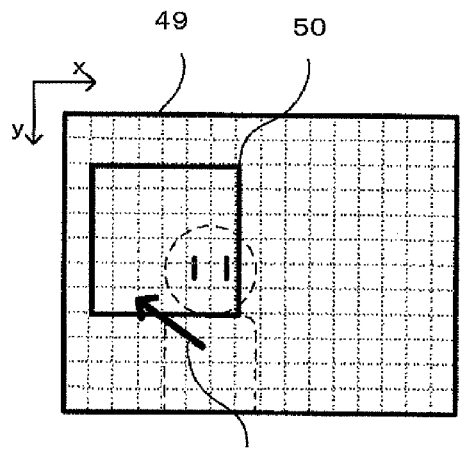
Figure 13:
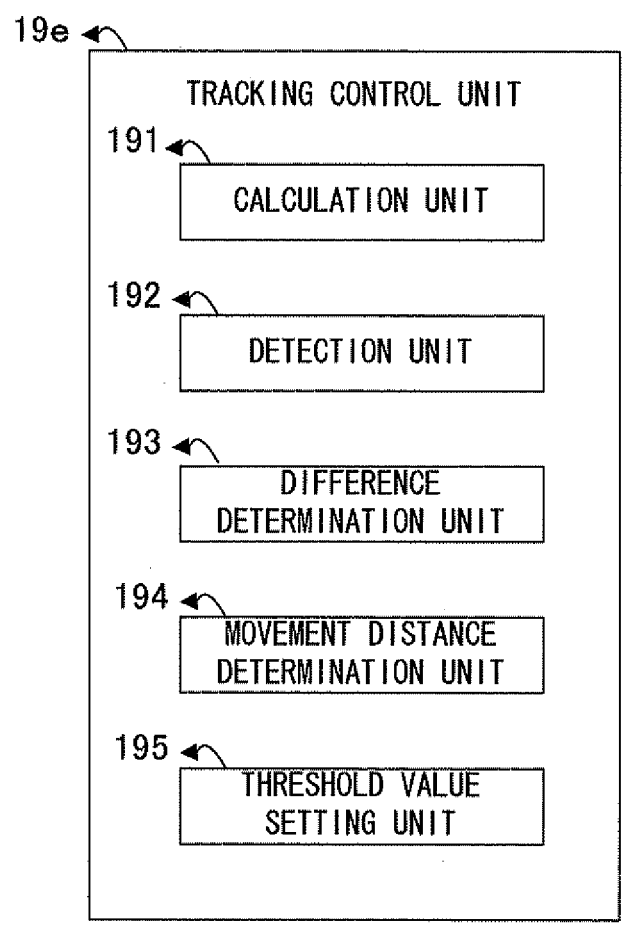

FIG. 6A presents a diagram for illustrating an image tracking method according to an embodiment, illustrating an example of how to set a search region and a tracking subject region, and FIG. 6B presents a diagram for illustrating an image tracking method according to an embodiment, showing an example of a template image;

FIG. 7A presents a diagram for illustrating an image tracking method according to an embodiment, illustrating a tracking calculation process for a subsequent tracking image, and FIG. 7B presents a diagram for illustrating an image tracking method according to an embodiment, illustrating a new tracking subject region;

FIG. 8 presents a flowchart illustrating an image tracking process according to an embodiment of the present invention;

FIG. 9 presents a flowchart illustrating an initial process of tracking control;

FIG. 10 presents a flowchart illustrating a process of determining a new position of a tracking subject;

FIG. 11A presents a diagram illustrating a fixed region according to a variation of the present invention, illustrating a case in which the fixed region covers an entire region of the photographing screen; FIG. 11B presents a diagram illustrating a fixed region according to a variation of the present invention, illustrating a case in which the fixed region is near a center of the photographing screen; and FIG. 11C presents a diagram illustrating a fixed region according to a variation of the present invention, illustrating a case in which the fixed region includes a focus detection area 45;

FIG. 12A presents a diagram illustrating first and second search regions according to a variation of the present invention, for a case in which the first search region is set as a fixed region over the entire photographing screen and the second search region is set as a last time region; FIG. 12B presents a diagram illustrating first and second search regions according to a variation of the present invention, for a case in which the first search region is set as a last time region and the second search region is set as a fixed region; FIG. 12C presents a diagram illustrating first and second search regions according to a variation of the present invention, for a case in which the first search region is set as a last time region and the second search region is set as a prediction region; and FIG. 12D presents a diagram illustrating first and second search regions according to a variation of the present invention, for a case in which the first search region is set as a fixed region over the entire photographing screen and the second search region is fixed as a prediction region; and FIG. 13 presents a block diagram illustrating the function of a tracking control unit according to an embodiment of the present invention.

DESCRIPTION OF PREFERRED EMBODIMENTS

One embodiment of an imaging apparatus (single-lens reflex digital still camera) equipped with an image tracking device having the following functions will be described. The image tracking device has an automatic focus adjustment (AF) function and an image tracking function. As the AF function, the image tracking device detects a focus adjustment state (defocus amount in the embodiment) of a photographing lens at a plurality of focus detection areas set within a photographing screen and focus driving the photographing lens based on the defocus amount of one of the areas. As the image tracking function, the image tracking device stores an image of a subject to be tracked in the photographing images as a template image (reference image) and tracks the target subject to be tracked while searching for a position of the image same as or similar to the template image of the repeatedly photographed images (template matching). And the image tracking device tracks the target to be tracked while driving the photographing lens with the AF function and the image tracking function.

Figure 1:
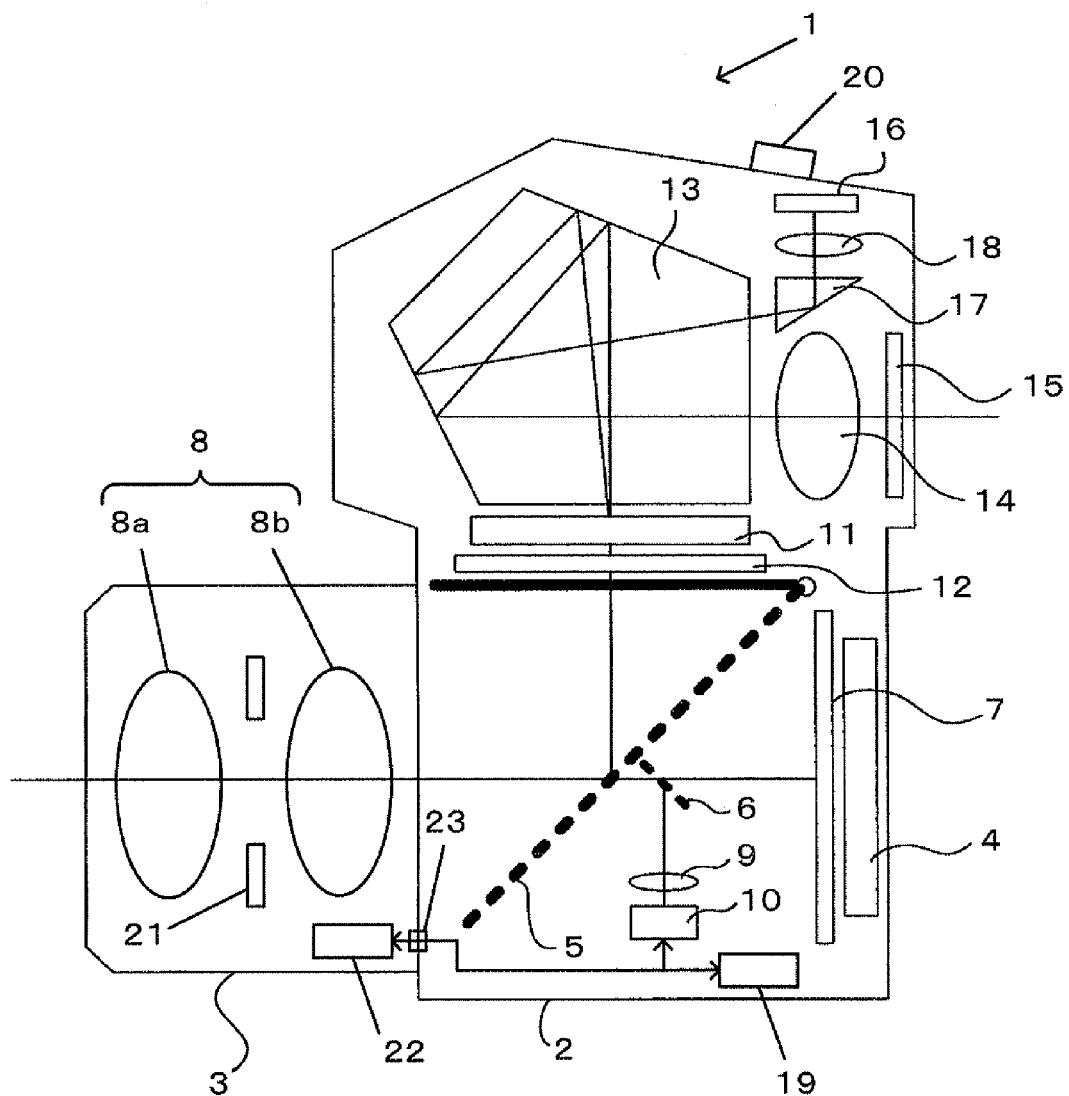
FIG. 1 is a cross-sectional view showing a configuration an imaging apparatus equipped with an image tracking device according to an embodiment of the present invention.

FIG. 1 shows a configuration of the imaging apparatus (single-lens reflex digital still camera) 1 equipped with the image tracking device according to one embodiment. In FIG. 1, illustration and description are not provided on equipment and circuits of the camera not directly related to the embodiment of the present invention. The camera 1 according to one embodiment has an interchangeable lens 3 including a photographing lens 8, an aperture and so on is attached to a camera body 2 in an interchangeable manner. A first imaging element 4 for imaging a subject image and recording the image is arranged in the camera body 2. The first imaging element 4 is configured by CCD, CMOS, or the like. In time of photographing, a quick return mirror 5 and a sub-mirror 6 evacuate to a position outside a photographing optical path shown with a solid line, and a shutter 7 is opened, so that the subject image is imaged on a light receiving surface of the first imaging element 4 by a photographing lens 8.

A focus detection optical system 9 and a distance measuring element 10 for detecting the focus adjustment state of the photographing lens 8 are arranged at the bottom of the camera body 2. In this embodiment, an example of adopting a focus detection method by a pupil split phase difference detection system is shown. The focus detection optical system 9 guides a pair of focus detection light fluxes passed through the photographing lens 8 to a light receiving surface of the distance measuring element 10, and images a pair of optical images. The distance measuring element 10 includes a pair of CCD line sensors, for example, and outputs a focus detection signal corresponding to the pair of optical images. The quick return mirror 5 and the sub-mirror 6 are set at a position in the photographing optical path as shown with a broken line before photographing, where the pair of focus detection light fluxes from the photographing lens 8 are transmitted through a half mirror part of the quick return mirror 5, reflected by the sub-mirror 6, and guided to the focus detection optical system 9 and the distance measuring element 10.

A finder optical system is arranged at the upper part of the camera body 2. The quick return mirror 5 and the sub-mirror 6 are at a position shown with a broken line before photographing, where a portion of the subject light from the photographing lens 8 is reflected by the quick return mirror 5 and guided to a focusing screen 11 so that the subject image is imaged on the focusing screen 11. A liquid crystal display element 12 displays information such as focus detection area mark in a superimposed manner on the subject image imaged on the focusing screen 11, and also displays various photographing information such as exposure value at a position outside the subject image. The subject image on the focusing screen 11 is guided to an eyepiece window 15 through a pentagonal roof prism 13 and an eyepiece lens 14, so that the photographer can visually recognize the subject image.

Figure 3:
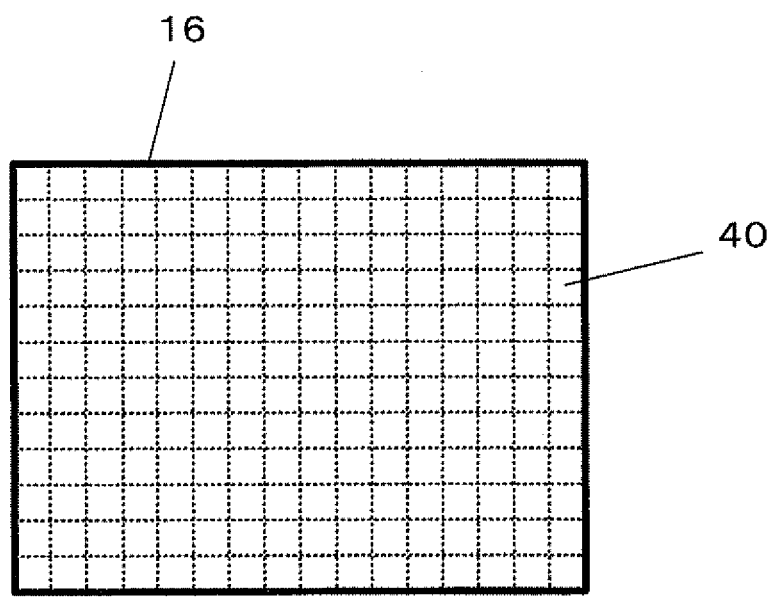
FIG. 3 is a front view illustrating a second imaging element.
Figure 4:
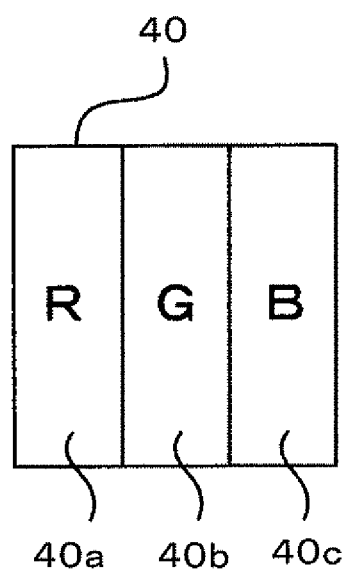
FIG. 4 is a diagram showing a filter for a pixel of the second imaging element.

A second imaging element 16 for imaging the subject image for subject tracking or photometry is arranged in the finder optical system at the upper part of the camera body 2. The subject image imaged on the focusing screen 11 is re-imaged on a light receiving surface of the second imaging element 16 through the pentagonal roof prism 13, a prism 17, and an imaging lens 18. FIG. 3 is a front view showing a detailed configuration of the second imaging element 16. The second imaging element 16 includes a plurality of (herein, 16×12=192) pixels (photoelectric conversion elements) 40 arrayed in a matrix form. As shown in FIG. 4, each pixel 40 is divided into three portions 40a, 40b, and 40c, and primary color filters of red R, green G, and blue 13 are arranged in the portions 40a, 40b, and 40c, respectively. Thus, the RGB signal of the subject image can be output for every pixel 40. The details will be described later, where the tracking control and the exposure calculation are performed based on a signal corresponding to the subject image imaged by the second imaging element 16. Note that the tracking control and the exposure calculation may be performed based on a signal corresponding to the subject image imaged by the first imaging element 4.

A body drive control device 19, an operation member 20, and the like are arranged in the camera body 2. The body drive control device 19 is configured by a microcomputer, peripheral components such as memory and A/D converter, and the like to be described later in detail, and performs various controls and calculations of the camera 1. The operation member 20 includes switches and selectors for operating the camera 1 such as shutter button, focus detection area selection switch, photographing mode selection switch, and the like.

A zooming lens 8a, a focusing lens 8b, an aperture 21, a lens drive control device 22, and the like are arranged in the interchangeable lens 3. In the embodiment, the photographing lens 8 is representatively indicated with the zooming lens 8a, the focusing lens 8b, and the aperture 21, but the configuration of the photographing lens 8 is not limited to the configuration shown in FIG. 1. The lens drive control device 22 is configured by a microcomputer, peripheral components such as memory, drive circuit, and actuator, and the like (not shown), and performs drive control of the lenses 8a, 8b and the aperture 21 and setting position detection thereof. Information such as focal length and opening aperture value of the interchangeable lens 3 are stored in the memory built in the lens drive control device 22.

The body drive control device 19 and the lens drive control device 22 communicate through a contact point 23 of a lens mount unit, where information such as lens driving amount and aperture value are transmitted from the body drive control device 19 to the lens drive control device 22, and lens information and aperture information are transmitted from the lens drive control device 22 to the body drive control device 19.

Figure 2:
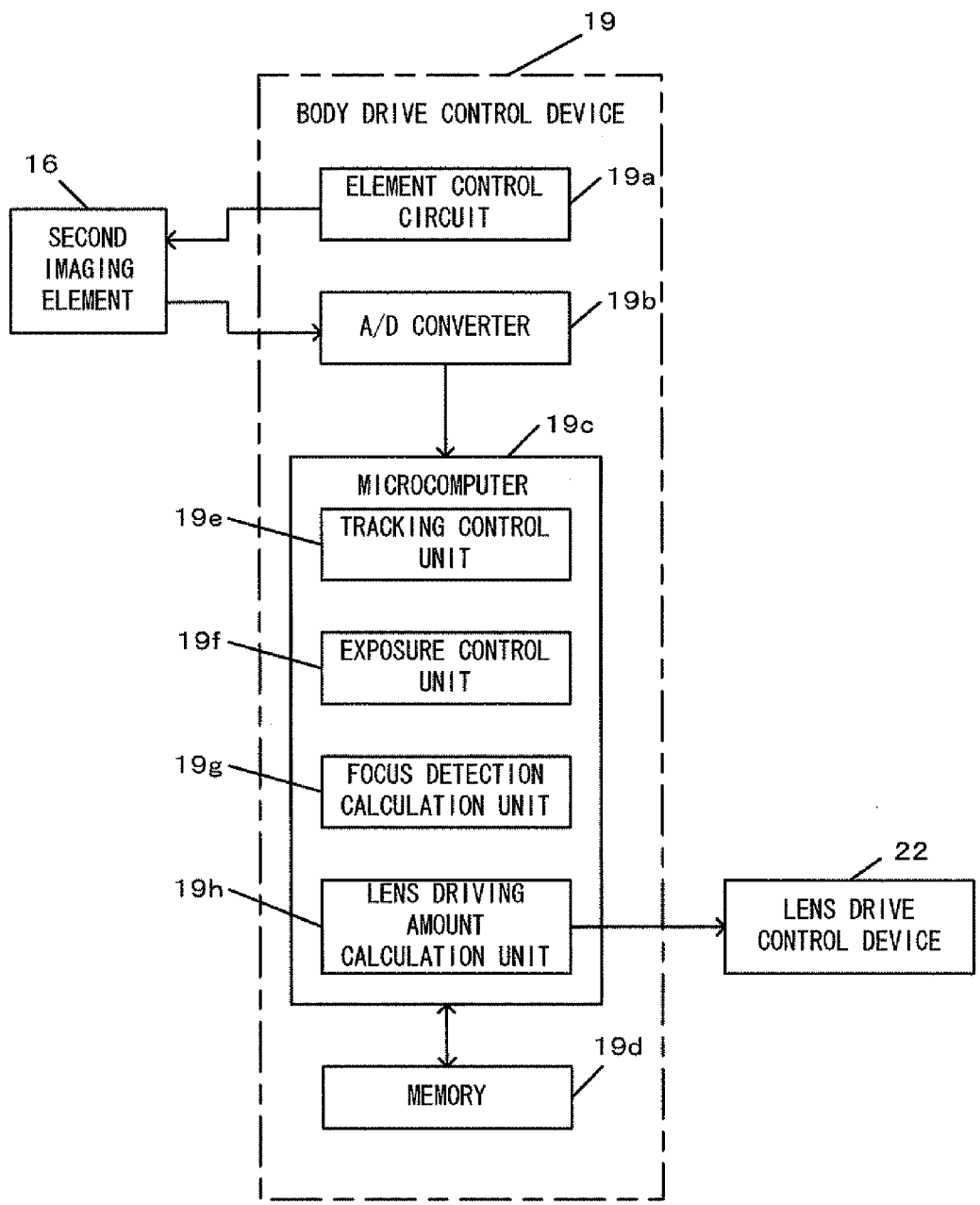
FIG. 2 is a block diagram presenting a configuration an imaging apparatus equipped with an image tracking device according to an embodiment of the present invention.

FIG. 2 shows a detailed configuration of the body drive control device 19. Illustration and description are not provided on the control functions not directly related to the embodiment of the present invention. The body drive control device 19 includes an element control circuit 19a, an A/D converter 19b, a microcomputer 19c, a memory 19d, and the like. The element control circuit 19a controls accumulation and readout of charges of the second imaging element 16. The A/D converter 19b converts an analog image signal output from the second imaging element 16 to a digital image signal. When the shutter button of the operation member 20 is half-pushed by the photographer, a half-push switch (not sown) is turned on. While the half-push switch is on, a portion of the subject light that has passed through the photographing lens 8 is reflected by the quick return mirror 5 shown in broken line as shown in FIG. 1, and guided to the second imaging element 16 through the pentagonal roof prism 13, the prism 17, and the imaging lens 18. While the shutter button is being half-pushed, the second imaging element 16 can repeatedly image the subject periodically.

The microcomputer 19c configures, in a software form, a tracking control unit 19e, an exposure control unit 19f, a focus detection calculation unit 19g, and a lens driving amount calculation unit 19h. The memory 19d stores information such as template image for image tracking and defocus amount, or lens information such as focal length, maximum aperture, aperture value, and conversion coefficient from image shift amount to defocus amount of the photographing lens 8.

The tracking control unit 19e stores the image corresponding to the tracking target position manually specified by the photographer or the tracking target position automatically set by the camera 1 out of the subject images imaged by the second imaging element 16 as a template image (reference image) in the memory 19d, and searches the image region that matches or is similar to the template image from the subsequently and repeatedly photographed images to recognize the position of the target. As shown in FIG. 13, the tracking control unit 19e functionally includes a calculation unit 191, a detection unit 192, a difference determination unit 193, a movement distance determination unit 194, and a threshold value setting unit 195. A detailed explanation on the calculation unit 191, the detection unit 192, the difference determination unit 193, the movement distance determination unit 194, and the threshold value setting unit 195 will be provided later on. The exposure calculation unit 19f calculates an exposure value based on the signal corresponding to the image imaged by the second imaging element 16.

The focus detection calculation unit 19g detects the focus adjustment state, or defocus amount herein, of the photographing lens 8 based on the focus detection signal corresponding to the pair of optical images output from the distance measuring element 10. The details will be described later, but a plurality of focus detection areas is set within the photographing screen of the photographing lens 8, the distance measuring element 10 outputs the focus detection signal corresponding to the pair of optical images for every focus detection area, and the focus detection calculation unit 19*g* detects the defocus amount based on the focus detection signal corresponding to the pair of optical images for every focus detection area.

When the shutter button of the operation member 20 is half-pushed by the photographer, a half-push switch (not sown) is turned on, and a portion of the subject light that has passed through the photographing lens 8 passes through the half-mirror portion of the quick return mirror 5 shown in broken line as shown in FIG. 1, and guided to the distance measuring element 10 through the sub-mirror 6 and the focus detection optical system 9, allowing the focus detection calculation unit 19 to perform focus detection calculation. The lens driving amount calculation unit 19*h* converts the detected defocus amount to the lens driving amount. While the shutter button is being half-pushed, the focus detection calculation unit 19*g* repeats to detect the focus detection state periodically.

Figure 5:
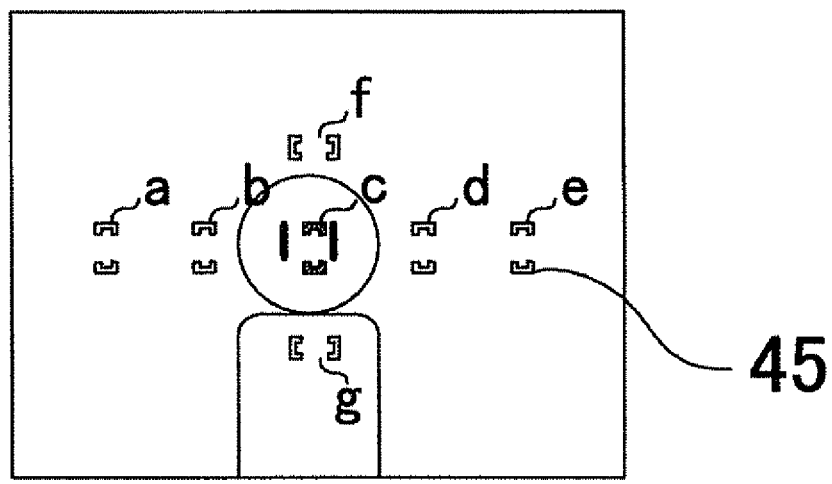
FIG. 5 is a diagram illustrating an image tracking method according to an embodiment of the present invention.

The subject tracking operation according to one embodiment will now be described. FIG. 5 to FIG. 7 are views illustrating the subject tracking method according to one embodiment, and FIG. 8 to FIG. 10 are flowcharts showing the subject tracking process according to one embodiment. The microcomputer 19*c* starts subject tracking process when the user half-pushes the shutter button of the operation member 20 after a target subject to be tracked is specified or set from the subject images imaged by the second imaging element 16. Note that the target subject to be tracked is specified by the user manually and the target subject to be tracked is automatically set by the camera. In the subsequent description, a coordination system in which the x-axis is set in a horizontal direction and the y-axis is set in a vertical direction is used in FIGS. 6A, 6B, 7A, and 7B.

Other than when the shutter button is fully pushed to carry out photographing, the quick return mirror 5 is set within the photographing optical path shown with a broken line in FIG. 1, and a portion of the subject light entered from the photographing lens 8 is imaged on the focusing screen 11. The subject image on the focusing screen 11 is guided to the second imaging element 16 through the pentagonal roof prism 13, the prism 17, and the imaging lens 18, and the subject image signal is repeatedly output from the second imaging element 16.

A plurality of focus detection areas is set in the photographing lens 8, where an area mark is superimposed on the subject image on the focusing screen 11 by the liquid crystal display element 12, and the position of each focus detection area is displayed. In the instant embodiment as shown in FIG. 5, an example where the focus detection areas 45*a* to 45*g* (indicated "a" to "g" in FIG. 5) are set at seven locations within the photographing screen is shown. The mark of the relevant area is lighting displayed when an arbitrary area is selected by the focus detection area selection switch of the operation member 20.

As shown in FIG. 5, when the focus detection area 45*c* is selected by the focus detection area selection switch of the operation member 20, and the shutter button of the operation member 20 is half-pushed in this state, the microcomputer 19*c* stores focus detection area 45*c* in the memory 19*d* as an initial AF area. The subject in the initial AF area is thereby specified as the subject to be tracked. An example in which the photographer selects the initial AF area and manually specifies the subject to be tracked has been shown, but the initial AF area and the subject to be tracked may be set by the microcomputer 19*c* based on subject recognition result, for example, in a camera having a function of automatically recognizing the subject.

In step 1 of FIG. 8, the element control circuit 19*a* causes an initial tracking image (firstly acquired image after the image tracking process is started) to be acquired by the second imaging element 16. The initial tracking image is represented in RGB value for every pixel as shown in equation (1) below:

$$R[x,y], G[x,y], B[x,y] \quad (1)$$

where x=1 to 16, and y=1 to 12.

The color information and luminance information of each pixel are calculated by the calculation unit 191 based on the RGB value of every pixel. Here, the color information is represented by RG, BG which are values that indicate degrees of color failure as shown by equation (2) below. The luminance information is represented by L, which is calculated from the exposure time T, the gain Gain, and the color combining coefficients Kr, Kg, and Kb for a case where the image is acquired.

$$RG[x,y]=\text{Log}_2(R[x,y])-\text{Log}_2(G[x,y]),$$

$$BG[x,y]=\text{Log}_2(B[x,y])-\text{Log}_2(G[x,y]),$$

$$L[x,y]=\text{Log}_2(Kr \times R[x,y]+Kg \times G[x,y]+Kb \times B[x,y])-\text{Log}_2(T)-\text{Log}_2(\text{Gain}) \quad (2)$$

In the following step 2, the initial process of tracking control shown in FIG. 9 is executed. In step S101 of FIG. 9, the calculation unit 191 stores image information at the position specified by the photographer (herein the focus detection area 45*c* as the initial AF area) (cf. equation (2)) out of the initial tracking image, as subject color information. In step S102, the calculation unit 191 detects a same color information region. As shown in FIG. 6A, the same color information region is a region that indicates the color information similar to the subject color information at the periphery of the position of the focus detection area 45*c* (see FIG. 5) in the initial tracking image. In the subsequent step 103, the calculation unit 191 determines a rectangular region including the same color information region as an initial tracking subject region 47. Here, an example of determining the tracking subject region 47 based on the subject color information is shown, but the size of the tracking subject region may be unified such as 4×4 pixels to simplify the process, or the size of the subject region may be determined according to the distance information of the photographing lens 8 or image magnification ratio of the subject.

In step 104, the calculation unit 191 stores, in the memory 19*d*, the image of the tracking subject region 47 in the initial tracking image as a template image 48 (see FIG. 6B) used in the image tracking process. For instance, when the size of the tracking subject region 47 is 4×4 pixels and the starting point position of the tracking subject region 47 is (x, y)=(4, 5) as shown in FIG. 6A, the color information and the illumination information of the template image 48 shown in FIG. 6B is expressed by equation (3) below.

$$RGref[rx,ry]=RG[x,y],$$

$$BGref[rx,ry]=BG[x,y],$$

$$Lref[rx,ry]=L[x,y], \quad (3)$$

rx=1 to 4, ry=1 to 4, x=7 to 10, y=5 to 8

In step S105, the calculation unit 191 determines a region within which an image same as or similar to the template image 48 is searched in the subsequent tracking image to be captured. Here, as shown in FIG. 6A, the calculation unit 191 sets a region as a first search region 49, with the region being included by a pixel region (12×12 pixels) enlarged by a predetermined number of pixels (four pixels herein) towards the front, the back, the left, and the right with the tracking subject region 47 as the center. In addition, the calculation unit sets a region as a second search region 50, with the region being included by a pixel region (8×8 pixels) enlarged by two pixels towards the front, the back, the left, and the right with the tracking subject region 47 as the center. Accordingly, in the embodiment shown in FIG. 6A, the first search region 49 is included in a range of x=3 to 14, and y=1 to 12. The second search region 50 is included in a range of x=5 to 12, and y=3 to 10.

The calculation unit 191 sets the first search region 49 and the second search region 50 preferably taking the tracking subject region 47 as a center. The subject to be tracked moves from the position detected this time, i.e., the tracking subject region 47 as a starting point. Therefore, the setting the first search region 49 and the second search region 50 with the tracking subject region 47 being as the center by the calculation unit 191 enables the target subject to be tracked to be detected in a shorter time, thereby increasing the responsibility of image tracking. The first search region 49 and the second search region 50 may be expanded with predetermined numbers of pixels in the directions of length and width, respectively, to have predetermined size or their sizes may be changed according to tracking results or the size of the tracking subject.

After the initial process of tracking control is terminated, the process proceeds to step S3 of FIG. 8, and whether or not the shutter button of the operation member 20 is completely pushed, that is, whether or not the shutter release operation is performed is checked. When the shutter release operation is not made, the process proceeds to step S4, and the processes in step S4 and subsequent steps are repeated until the shutter button of the operation member 20 is completely pushed. In step S4, the element controlling circuit 19a causes the second imaging element 16 to acquire a subsequent tracking image and image information R[x, y], G[x, y], and B[x, y] (x=1 to 16, y=1 to 12) are acquired in the same manner as in the process in step S1. The calculation unit 191 calculates the color information RG[x, y], BG[x, y] and the luminance information L[x, y].

In step S5, the calculation unit 191 executes a tracking calculation process. The calculation unit 191 sequentially cuts out the region of the same size as the tracking subject region 47 shown in FIG. 6A from the first search region 49 in the subsequent tracking image, and the calculation unit 191 calculates correlation for every corresponding pixel of the cutout image and the template image 48 shown in FIG. 6B, that is, a difference Diff in image information.

The calculation unit 191 calculates the Diff according to equation (4) below, As shown in FIG. 7A, the starting point position of the search region 49 is set to (scx, scy)=(3, 1).

$$Diff[dx, dy] = \sum_{rx=1}^{4} \sum_{ry=1}^{4} \{ABS$$

$$(RG[scx + dx - 1 + rx, scy + dy - 1 + ry] - RGref[rx, ry]) +$$

$$ABS(BG[scx + dx - 1 + rx, scy + dy - 1 + ry] - B$$

$$Gref[rx, ry]) + ABS(L[scx + dx - 1 + rx,$$

$$scy + dy - 1 + ry] - Lref[rx, ry])\}$$

$$dx = 1 \sim 9, dy = 1 \sim 9, rx = 1 \sim 4, ry = 1 \sim 4, scx = 3, scy = 1$$

The "dx" and "dy" in equation (4) indicate each a range (amount) in which the starting point position of cutting images is to be shifted. That is, in FIG. 7A, dx=1 corresponds to x=3 and dy=1 corresponds to y=1. Equation (4) indicates that the calculation unit 1 sequentially cuts out the region of the same size as the tracking subject region 47 from the first search region 49 in the subsequent tracking image while shifting the region by one pixel in the search region 49 to acquire cutout images, and calculates the difference Diff in color information for every corresponding pixel of the cutout image and the template image 48. As shown in FIG. 7A, the calculation unit 191 sequentially compares the sequential cutout images cut out from the first search region 49 (49a, 49b, and 49c in FIG. 7A) with the template image 48 to calculate the difference Diff in color information with the template image 48 for every cutout image. The cutout image that indicates the least value among the differences Diff is considered to be closest in similarity to the template image 48 (cf. FIG. 6B).

In step S6, the calculation unit 191 performs a new tracking subject position determination process for determining a new position of the tracking subject as shown in FIG. 10. In step S201, the calculation unit 191 detects the smallest value (first minimum difference value MinDiff) among the differences Diff in image information of the cutout images with the template image 48 calculated according to the equation (4) above. Then, the calculation unit 191 detects coordinates (Mindx, Mindy) of the cutout image when the difference Diff indicates the first minimum difference MinDiff.

In step S202, the calculation unit 191 detects the smallest value (second minimum difference MinDiff_S) among the differences Diff that indicate correlations between the template image 48 and the image information contained in the second search region 50 (x=5 to 12, y=3 to 10 in FIG. 7A). The calculation unit 191 further detects coordinates (Mindy_S, Mindy_S) of the image information contained in the second search region 50 when the difference Diff indicates the second minimum difference MinDiff_S. In FIG. 7A, the starting point position of cutting out images corresponding to the second search region 50 is in a range of dx=3 to 7, dy=3 to 7.

In step S203, the difference judgment unit 193 determines whether or not the first minimum difference MinDiff and the second minimum difference MinDiff_S are the same value. When the first minimum difference MinDiff is and the second minimum difference MinDiff_S are the same value, the difference determination unit 193 determines the result of step S203 to be negative and the process proceeds to step S207 to be detailed later. When the first minimum difference MinDiff and the second minimum difference MinDiff_S are different from each other, the difference determination unit 193 determines the result of step S203 to be affirmative and the process proceeds to step S204. Here, the cases where the first minimum difference MinDiff and the second minimum difference MinDiff are different from each other include the following cases.

(A1) A case where the target subject to be tracked moves at a high speed in the photographic screen, so that the target subject to be tracked is detected in the first search region 49, which is relatively large.

(A2) A case where the target subject to be tracked moves at a low speed or remains stationary in the screen, so that the target subject to be tracked is present in the second search region 49, which is relatively small, but a subject other than the target subject to be tracked, having color information similar to that of the target is detected in the background (false matching).

In step S204, the difference determination unit 193 compares the first minimum difference MinDiff and the second minimum difference MinDiff_S, that is, calculates a difference therebetween. Then, the difference determination unit 193 determines whether or not the calculated difference is less than a predetermined threshold value Wth1. When the difference is larger than the threshold value Wth1, the difference determination unit 193 determines the result of step S204 is negative and the process proceeds to step S207. On this occasion, the tracking control unit 19e deems that the case (A1) is highly possible. The threshold value Wth1 is a fixed value set by a threshold value setting unit 195 based on, for example, simulation previously performed, which is stored in a memory (not shown) or the like. The threshold value setting unit 195 sets the threshold value Wth1 such that even if the target subject to be tracked moves over a long distance in the photographing screen, the target can be followed and even if there is in the background a subject having high similarity to the template image 48, false matching with the subject having high similarity to the template image 48 can hardly occur. More particularly, the threshold setting unit 195 sets the threshold value Wth1 at around 1.0 when an average of minimum differences MinDiff is 6.0 to 7.0.

When the difference is less than the threshold value Wth1, the difference determination unit 193 determines the result of step S204 to be affirmative and the process proceeds to step S205. Here, cases where the difference is less than the threshold value Wth1 include the following cases.

(B1) A case where the target subject to be tracked is located at the position of the first minimum difference MinDiff but false matching occurs in the second search region (B2) A case where the target subject to be tracked is located within the second search region but there is detected in the background (the first search region 49) a subject other than the target subject to be tracked, having color information similar to that of the target.

In step S205, the movement distance determination unit 194 determines whether or not a value relating to the movement distance of the target subject to be tracked is equal to or larger than the predetermined threshold value Wth1. In the present embodiment, the movement distance determination unit 194 determines whether or not the movement distance per cycle of the target subject to be tracked in the photographing screen in the past is equal to or less than a threshold value Wth2 (for example, 2 pixels) based on a result of new tracking subject position detection process in image tracking operation (steps S4 to S9 in FIG. 8) for 5 times (5 cycles) in the past. When the movement distance of the target subject to be tracked in the photographing screen in one cycle is within 2 pixels, the movement distance determination unit 194 determines the result of step S205 to be affirmative and the process proceeds to step S206. On this occasion, the tracking control unit 19e deems the case (B2) above is highly possible, that is, the target subject to be tracked is present in the second search region 50 based on the history of the position of the target subject to be tracked since the possibility that the target subject to be tracked having a relatively short movement distance in the photographing screen abruptly moves over a long distance is considered low.

Instead of comparison of the movement distance per cycle of the target subject to be tracked in the photographic screen in the past with the threshold value Wth2, comparison of the movement speed of the target subject to be tracked in the photographic screen with the threshold value Wth2 may be used. In step S206, the detection unit 192 determines a position of the image information detected in the second search region 50 as the new tracking subject region 47 when the difference Diff indicates the second minimum difference MinDiff_S. In other words, the detection unit 192 sets a region of 4×4 pixels having a starting point position being at coordinates (Mindx_S, Mindy_S) as the new tracking subject region 47.

When the movement distance of the subject to be tracked in the photographing screen in one cycle exceeds 2 pixels, the movement distance determination unit 194 determines the result of step S205 to be negative and the process proceeds to step S207. On this occasion, the tracking control unit 19e deems the case (B1) is highly possible since the movement distance of the subject to be tracked in the photographing screen is relatively large. In step S207, the detection unit 192 determines the position of the image information detected in the first search region 49 as the new tracking subject region 47 when the difference Diff indicates the first minimum difference MinDiff. That is the detection unit 192 sets a region of 4×4 pixels having a starting point position at coordinates (Mindy, Mindy) as the new tracking subject region 47. When the result of step S203 is determined to be negative by the difference determination unit 193, that is, when the first minimum difference MinDiff is equal to the second minimum difference MinDiff_S, the detection unit 192 determines the new tracking subject region 47 based on the position corresponding to the first minimum difference MinDiff detected in the first search region 49. FIG. 7B presents a diagram that illustrates an example of the position of the new tracking subject region 47 having been determined by the new tracking subject position determination process. In the example shown in FIG. 7B, a region of 4×4 pixels having a starting point position of (x,y)=(8,5) is determined as the new tracking subject region 47. That is, FIG. 7B illustrates the case where the subject to be tracked is detected in the second search region 50 by the detection unit 192. With that the new tracking subject position determination process is completed and the process returns to step S7 in FIG. 8.

In step S7 in FIG. 8, the tracking control unit 19e compares the first minimum difference MinDiff or the second minimum difference MinDiff_S with a previously set similarity threshold value Dth. Then, the tracking control unit 19e determines whether or not the new tracking subject region 47 determined by the new tracking subject position determination process is similar to the template image 48. The similarity threshold value Dth is set as a value that enables proper similarity determination in an ordinary photographic scene.

In step S8, the tacking control unit 19e performs an updating process to update the template image 48 when the new tracking subject region 47 is determined to be similar to the template image 48 in step S7. In the present embodiment, the new template image 48 is generated by adding 20% of the image information of the new tracking subject region with respect to 80% of the image information of the original template image, for example, so that the calculation in the updating process can be expressed by equation (5) below.

$$RGref[rx,ry]=0.8 \times RGref[rx,ry]+0.2 \times RG[x,y],$$

$$BGref[rx,ry]=0.8 \times BGref[rx,ry]+0.2 \times BG[x,y],$$

$$Lref[rx,ry]=0.8 \times Lref[rx,ry]+0.2 \times L[x,y], \quad (5)$$

rx=1 to 4, ry=1 to 4, x=8 to 11, y=5 to 8

As a result of the updating process for the template image 48, recent image information is gradually added to the image information of the original template image 48. Thus, an influence of an abrupt change of the subject to be tracked (for example, a change in the orientation of the face of the subject), if any, of some sort is minimized, thereby increasing the reliability of the tracking of the subject. The proportion of the image information of the original template image 48 and the image information of the new tracking subject region 47 may be a fixed value, or may be changed according to the minimum difference MinDiff.

In step S9, the calculation unit 191 determines the new first search region 49 and the new second search region 50 for the new tracking subject region 47. Here, a region of x=4 to 15, y=1 to 12 and a region of x=6 to 13, y=3 to 10 that surrounds the tracking subject region 47 (x=8 to 11, y=5 to 8) are set as the first and second search regions 49 and 50, respectively as shown in FIG. 7B. Further, after the determination of the new tracking subject region 47, the focus detection calculation unit 19g performs focus adjustment on the subject to be tracked included in the new tracking subject region 47.

When at least one of focus detection areas 45a to 45g is included in the new tracking subject region 47, the focus detection calculation unit 19g adopts the smallest defocus amount out of defocus amounts detected in the focus detection areas 45a to 45g included in the new tracking subject region 47. The lens driving amount calculation unit 19h and the lens drive control device 22 perform focus adjustment of the photographing lens 8 based on the adopted defocus amount. When the focus detection areas 45a to 45g are not included in the new tracking subject region 47, the focus detection calculation unit 19c may determine which one of the focus detection areas 45a to 45g is to be adopted based on at least one of a distance from the new tracking subject region 47 and a distance from the one among the focus detection areas 45a to 45g being adopted in the previous tracking result. When the above-mentioned processing is completed, the process returns to step S3.

When it is detected that the shutter button of the operation member 20 is completely pushed, the process proceeds to step S10 and the microcomputer 19c executes photographing control. Upon the photographing control, the exposure control unit 19f performs exposure calculation based on illumination information of the new tracking subject region 47 determined in step S9 and calculates an aperture value and a shutter speed. The microcomputer 19c drives and controls the shutter 7 and the aperture 21 based on the exposure values and causes the first imaging element 4 to perform image-capturing.

The above-mentioned embodiment presents the following advantages.

(1) The second imaging element 16 is configured to repeatedly capture an image in a photographing screen through the photographing lens 8 to produce photographing images. The calculation unit 191 is configured to calculate the first minimum difference MinDiff that indicates correlation between the image information of the first search region 49 in the subject image and template image 48 based on the target image. Further, the calculation unit 191 is configured to calculate the second minimum difference MinDiff_S that indicates correlation between the image information of the second search region 50 other than the first search region 49 in the subject image and the image information of the template image 48. On the other hand, the detection unit 192 is configured to detect the position of the target image in the subject image based on one of the first minimum difference MinDiff and the second minimum difference MinDiff_S. Therefore, it is prevented that a subject other than the target subject to be tracked in the photographing screen is erroneously detected, thereby increasing precision of tracking.

(2) The first search region 49 is configured to be larger than the second search region 50 and the difference determination unit 193 is configured to detect whether or not a difference between the first minimum difference MinDiff and the second minimum difference MinDiff_S exceeds the threshold value Wth1. And the detection unit 192 is configured to detect the position of the target image in the subject image based on the first minimum difference MinDiff when the difference between the first minimum difference MinDiff and the second minimum difference MinDiff_S exceeds the threshold value Wth1 or based on the second minimum difference MinDiff_S when the difference between the first minimum difference MinDiff and the second minimum difference MinDiff_S is less than the threshold value Wth1. Therefore, even when the movement of the target subject to be tracked in the photographing screen is abruptly changed, the movement of the subject is followed without fail, so that precision of tracking can be maintained.

(3) The movement distance determination unit 194 is configured to determine whether or not the movement distance of the target image in the photographing screen is less than the threshold value Wth2 based on the positions of the target image after a plurality of times (herein 5 cycles) of determination. The detection unit 192 is configured to detect the position of the target image based on the second minimum difference MinDiff_S when the difference between the first minimum difference MinDiff and the second minimum difference MinDiff_S is determined to be less than the threshold value Wth1 and the movement distance is less than the threshold value Wth2. The detection unit 192 is configured to detect the position of the target image based on the first minimum difference MinDiff when the difference between the first minimum difference MinDiff and the second minimum difference MinDiff_S is determined to be less than the threshold value Wth1 and the movement distance is equal to or more than the threshold value Wth2. Therefore, false matching with respect to the background and the like in the photographing screen can be prevented from occurring so that the movement of the target subject to be tracked can be followed without fail.

The imaging device 1 according to the embodiment described above can be varied as follows.

(1) The positions of the first search region 49 and the second search region 50 are not limited to those set with the position of the tracking subject region 47 having been determined in the new tracking subject position determination process performed one cycle earlier. For example, a predetermined region centered around the position of the tracking subject region 47 having been determined by the new tracking subject position determination process performed one cycle earlier (last time region) and a predetermined region fixed in the photographing screen (fixed region) are determined as the first search region 49 and the second search region 50, respectively. The fixed region may be set, for example, like the region R surrounded with bold lines in FIGS. 11A to 11C. FIG. 11A shows the case in which the region R covers the entire photographing screen. FIG. 11B shows the case in which the region R extends over a region near the center of the photographing screen (starting point position (x,y)=(6,4), 6×6 pixels). FIG. 11C shows the case in which the region R extends over a region including the focus detection area 45 (starting point position (x,y)=(4,4), 10×6 pixels). Hereafter, an example on the position in which the first search region 49 and the second search region 50 are set will be described with reference to FIGS. 11A to 11C and FIGS. 12A to 12D. Explanation on this example will be made by setting a coordinate system in FIGS. 11A to 11C and FIGS. 12A to 12D in the same manner as in the case shown in FIGS. 6A, 6B, 7A and 7B.

(1-1) FIG. 12A shows the case in which the first search region 49 is set over the entire photographing screen shown in FIG. 11A as the fixed region and the second search region 50 is set as the last time region. In FIG. 12A, the fixed region may be the region near the center of the photographing screen as shown in FIG. 11B or the predetermined region including the focus detection area as shown in FIG. 11C. FIG. 12A shows the example in which a region of 6×6 pixels having a starting point position of (x,y)=(4,4) is set as the second search region 50.

(1-2) FIG. 12B shows the case in which the first search region 49 is set to be the last time region and the second search region 50 is set to be the fixed region. In FIG. 12B, the predetermined region that includes the focus detection area shown in FIG. 11C is fixed as the fixed region. However, the fixed region may be the entire photographing screen as shown in FIG. 11A or the region near the center of the photographing screen as shown in FIG. 11B. FIG. 12B shows the case in which a region of 10×10 pixels having a starting point position of (x,y)=(2,2) is set as the first search region 49. The second search region 50 is set in a fixed region of 10×6 pixels having a starting point position of (x,y)=(4,4). On the other hand, a region where the first search region 49 and the second search region 50 overlap each other, i.e., a region of 6×8 pixels having a starting point position of (x,y)=(4,4) in FIG. 12 may be set as the second search region.

(1-3) In addition, when estimating the position of the target subject to be tracked in the photographing screen to be acquired next time based on the positions of the target subject to be tracked in the photographing screen having been acquired in a plurality of times, a predetermined region centered on an estimated position (estimation region) may be set as the first search region 49 or the second search region 50. In this case, the estimation region is estimated by calculating moving vector or the like of the target subject by using a conventional technology and making estimation based on the result of the calculation. When an estimation region can be set, the first search region 49 and the second search region 50 are set with any two of the fixed region, the last time region, and the estimation region. Since the case in which the fixed region and the last time region are used is similar to (1-1) and (1-2) above, explanation will be made herein on the case where the fixed region and the estimation region are used.

FIG. 12C shows the case in which the first search region 49 is set as the last time region and the second search region 50 is set as the estimation region. More particularly, FIG. 12C shows the example in which a region of 10×10 pixels having a starting point position of (x,y)=(2,2) is used as the fist search region 49 and a region of 6×6 pixels having a starting point position of (x,y)=(2,3) is used as the second search region 50, In FIG. 12C, the case in which the first search region 49 is set as the estimation region and the second search region 50 is set as the last time region may be used.

(1-4) FIG. 12D shows the case in which the first search region 49 is set as the fixed region over the entire photographing screen as shown in FIG. 11A and the second search region 50 is set as the estimation region. The entire photographing screen, that is, the entire region of the photographing screen may be set as the predetermined region. Alternatively, the fixed region may be the region near the center of the photographing screen as shown in FIG. 11B or the predetermined region including the focus detection area as shown in FIG. 11C. FIG. 12D shows the example in which a region of 6×6 pixels having a starting point position of (x,y)=(2,3) is set as the second search region 50. Also, the example in which the first search region 49 is set as the estimation region and the second search region 50 is set as the fixed region may be used.

(2) When the above-mentioned region including the focus detection area is set as the second search region 50, the processing in step S205 in FIG. 10, i.e., the process of determining whether or not the movement distance of the target subject to be tracked is equal to or larger than the threshold value Wth2 does not have to be performed. For example, when the region R in FIG. 11C is set as the second search region 50, the user may tend to catch up the subject to be tracked by using the focus detection area 45. For this reason, it will be highly possible that the calculation based on the first search region 49 that does not include the focus detection area 45 results in false matching. Therefore, the process can proceed to step S206 without performing the processing in step S205 to select calculation result based on the second search region, thereby decreasing processing loads.

(3) Instead of the threshold value Wth1 that is a fixed value, Wth1 may be a variable based on the first minimum difference MinDiff or the second minimum difference MinDiff_S. In this case, the tracking control unit 19e calculates the threshold value Wth1 based on, for example, the history or the like of the minimum difference value obtained after a plurality of times of processing. More particularly, the tracking control unit 19e may set as the threshold value Wth1 a difference between a maximum value and a minimum value of the first minimum differences MinDiff and the second minimum differences MinDiff_S when similarity is determined by the similarity determination process in step S7 in latest 5 cycles of processing.

(4) The tracking control unit 19e sets priority to the first minimum difference MinDiff and the second minimum difference MinDiff_S. The tracking control unit 19e may be configured to detect the position of the image to be tracked based on the minimum difference on which higher priority is set when the difference between the first minimum difference MinDiff and the second minimum difference MinDiff_ is less than the threshold value Wth1. In this case, the tracking control unit 19e may set higher priority to the minimum difference corresponding to, for example, the search region including the focus detection area 45e set near the center of the photographing screen.

The above described embodiments are exemplary and various modifications can be made without departing from the scope of the invention.

What is claimed is:

1. An image tracking apparatus comprising:
   an imaging unit that repeatedly captures an image formed through an imaging optical system to generate a photographing image;
   a calculation unit that sets a first search region and a second search region other than the first search region in the photographing image, calculates a first calculation result indicating correlation between image information on the first search region and reference information based on a target image, and calculates a second calculation result indicating correlation between image information on the second search region and the reference information;
   a detection unit that detects a position of the target image in the photographing image based on either one of the first calculation result and the second calculation result; and
   a first determination unit that determines whether or not a difference between the first calculation result and the second calculation result exceeds a first threshold value, wherein:
   the calculation unit sets the first search region as a region larger than the second search region, and
   the detection unit detects the position of the target image based on the first calculation result when the difference exceeds the first threshold value or based on the second calculation result when the difference is less than the first threshold value.

2. An image tracking apparatus according to claim 1, further comprising:
a second determination unit that determines whether or not a value associated with a movement distance of the target image in the photographing image is less than a second threshold value based on positions of the target image detected a plurality of times by the detection unit, wherein
the detection unit detects the position of the target image based on the second calculation result when the difference is determined by the first determination unit to be less than the first threshold value and the value associated with the movement distance is determined by the second determination unit to be less than the second threshold value, or detects the position of the target image based on the first calculation result when the difference is determined by the first determination unit to be less than the first threshold value and the value associated with the movement distance is determined by the second determination unit to be equal to or larger than the second threshold value.

3. An image tracking apparatus comprising:
an imaging unit that repeatedly captures an image formed through an imaging optical system to generate a photographing image;
a calculation unit that sets a first search region and a second search region other than the first search region in the photographing image, calculates a, first calculation result indicating correlation between image information on the first search region and reference information based on a target image, and calculates a second calculation result indicating correlation between image information on the second search region and the reference information;
a detection unit that detects a position of the target image in the photographing image based on either one of the first calculation result and the second, calculation result;
a first determination unit that determines whether or not a difference between the first calculation result and the second calculation result exceeds a first threshold value; and
a priority setting unit that sets priority on the first calculation result and the second calculation result, wherein
the detection unit detects the position of the target image based on a calculation result baying higher priority when the difference between the first calculation result and the second calculation result is less than the first threshold value.

4. An image tracking apparatus according to claim 1, further comprising,
a threshold value setting unit that sets the first threshold value as a predetermined fixed value.

5. An image tracking apparatus according to claim 1, further comprising:
a threshold value setting unit that sets the first threshold value based on the first calculation result and the second calculation result.

6. An image tracking apparatus comprising:
an imaging unit that repeatedly captures an image formed through an imaging optical system to generate a photographing image;
a calculation unit that calculates a first information indicating correlation between image information, on a first search region and reference information, and calculates a second information indicating correlation between image information on a second search region which is smaller than the first search region and reference information, based on a target image; and
a detection unit that detects the position of the target image based on the first information when a difference between the first information and the second information exceeds a predetermined value, and detects the position of the target based on the second information when the difference between the first information and the second information does not exceed a predetermined value.

7. An image tracking apparatus comprising:
an imaging unit that repeatedly captures an image formed through an imaging optical system to generate a photographing image;
a calculation unit that calculates a first information indicating correlation between image information on a first search region and reference information, and calculates a second information indicating correlation between image information on a second search region which is smaller than the first search region and reference information, based on a target image; and
a priority setting unit that sets priority on the first information and the second information, wherein
the detection unit detects the position of the target image based on an information having higher priority among the first information and the second information when the difference between the first information and the second information does not exceed a predetermined value.

8. An image tracking apparatus comprising:
an imaging unit that captures a first subject image and a second subject image after capturing the first subject image;
a region setting unit that sets a first search region on the first subject image and the second subject image, and sets a second search region which is smaller than the first search region on the first subject image and the second subject image;
a calculation unit that calculates a first information indicating correlation between image information on the first search region on the first subject image and reference information based on a target image, a second information indicating correlation between image information on the second search region on the first subject image and reference information based on a target image, a third information indicating correlation between image information on the first search region on the second subject image and reference information based on a target image, and a fourth information indicating correlation between image information on the second search, region on the second subject image and reference information based on a target image; and
a detection unit that detects a position of the target image based on at least one of the first information and the second information, and detects a position of the target image based on at least one of the third information and the fourth information thereafter.

9. An image tracking apparatus comprising:
an imaging unit that captures a first subject image and a second subject image after capturing the first subject image;
a region setting unit that sets a first search region on the first subject image and the second subject image, and sets a second search region which is different from the first search region on the first subject image and the second subject image;
a calculation unit that calculates a first information indicating correlation between image information on the first search region on the first subject image and reference information based on a target image, a second information indicating correlation between image information on the second search region on the first subject image and reference information based on a target image, a third information indicating correlation between image information on the first search region on the second subject image and reference information based on a target image, and a fourth information indicating correlation between image information on the second search region on the second subject image and reference information based on a target image; and a detection unit that detects a position of the target image based on at least one of the first information and the second information, and detects a position of the target image based on at least one of the third information and the fourth information thereafter.

10. An image tracking apparatus comprising:

a region setting unit that sets a first search region on a subject image captured by an image capture unit, and sets a second search region which is smaller than the first search region on the subject image;

a calculation unit that calculates a first information indicating correlation between image information on the first search region on the subject image and reference information based on a target image, and a second information indicating correlation between image information on the second search region on the subject image and reference information based on a target image; and a detection unit that detects a position of the target image based on at least one of the first information and the second information.

11. An image capturing apparatus comprising: an image tracking apparatus according to claim 6; an exposure calculation unit that performs an exposure calculation based on a signal output from the imaging unit; a record-image imaging unit, which is different from the imaging unit, to capture an image for recording.

12. An image capturing apparatus comprising:

an image tracking apparatus according to claim 6; wherein the detection unit detects the position of the target image based on a color information of the subject.

* * * * *